United States Patent [19]
Takamura et al.

[11] Patent Number: 6,012,747
[45] Date of Patent: Jan. 11, 2000

[54] LOCKING DEVICE

[75] Inventors: Noboru Takamura; Noboru Uematsu; Akihiro Takeda, all of Kanagawa, Japan

[73] Assignee: Ohi Seisakusho Co., Ltd., Kanagawa, Japan

[21] Appl. No.: 09/048,300

[22] Filed: Mar. 26, 1998

[51] Int. Cl.[7] ...................................................... E05C 3/06
[52] U.S. Cl. .............................. 292/216; 292/48; 292/56; 292/210
[58] Field of Search ................................ 292/44, 45, 48, 292/53, 56, 216, 210, DIG. 23, DIG. 43, DIG. 54, DIG. 64

[56] References Cited

U.S. PATENT DOCUMENTS

| | | | |
|---|---|---|---|
| 2,646,299 | 7/1953 | Kramer | 292/44 |
| 3,380,771 | 4/1968 | Rogers, Jr. | 292/210 |
| 3,858,916 | 1/1975 | Torii et al. | 292/45 |
| 4,869,536 | 9/1989 | Kleefeldt | 292/210 |
| 4,961,601 | 10/1990 | Lindholm et al. | 292/216 |
| 5,411,302 | 5/1995 | Shimada | 292/201 |
| 5,738,393 | 4/1998 | Chao | 292/216 |

FOREIGN PATENT DOCUMENTS

| | | | |
|---|---|---|---|
| 2486136 | 8/1982 | France | 292/44 |
| 1 653 994 | 4/1971 | Germany | E05B 65/20 |
| 3006151 | 4/1980 | Germany | 292/45 |
| 37 25 074 | 9/1988 | Germany | E05B 65/20 |
| 295 02 987 | 5/1995 | Germany | B60N 2/36 |
| 8-218711 | 8/1996 | Japan | E05B 65/32 |
| 2 164 086 | 3/1986 | United Kingdom | E05C 3/26 |
| 2 235 011 | 2/1991 | United Kingdom | E05B 65/34 |

*Primary Examiner*—Darnell M. Boucher
*Assistant Examiner*—John B. Walsh
*Attorney, Agent, or Firm*—Sughrue, Mion, Zinn, Macpeak & Seas, PLLC

[57] ABSTRACT

A locking device is constituted by: a casing; a cover fastened to the casing into a unit construction; a latch plate for latching a striker, the latch plate being rotatably supported by the casing and the cover; a locking plate being rotatably supported by the casing and the cover, the locking plate locking the latch plate in its turn, thereby to ensure the latching of the striker by the latch plate; locking-state removal means for removing the locking of the striker by the latch plate by turning the locking plate; and a striker pressing plate, rotatably supported by the cover, for pressing the striker against the latch plate in a state that the latch plate 16 is locked in its turn.

14 Claims, 11 Drawing Sheets

LOCKING DEVICE

BACKGROUND OF THE INVENTION

1. Field of the Invention

The present invention relates to a locking device for locking a vehicle door, an engine hood, a trunk lid, a reclining seat back, and the like.

2. Description of the Related Art

Figure 20:
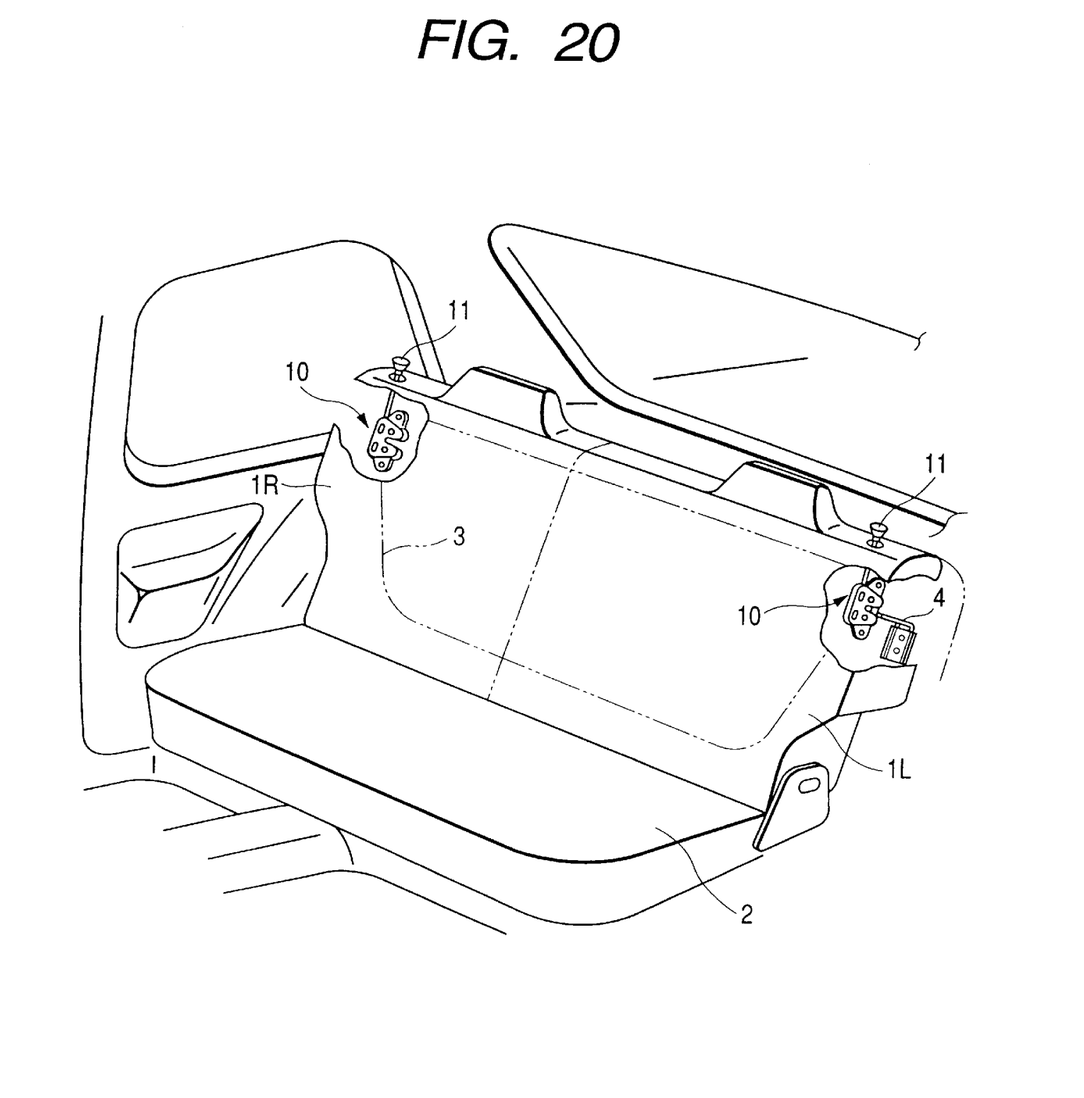
FIG. 20 is a perspective view showing the inside of a vehicle equipped with a locking device.

The vehicle has an opening/closing door, an engine hood, a trunk lid, a reclining seat back, and the like. The locking device is used for locking those components. An example of the rear seat of an automobile or a motor car of the sedan type is schematically illustrated in FIG. 20. The rear seat back is divided into two sections 1L and 1R, and those divided rear backs may be turned down onto the seat cushion 2 independently. An opening 3 is formed in the rear floor pan partitioning the trunk room. When the divided rear seat backs 1L and 1R are turned down to the seat cushion 2, the trunk room is opened into the inside of the car. To load the car with a long baggage, e.g., skis, that cannot be accommodated within the trunk room, the divided rear seat back 1L or 1R is turned down onto the seat cushion 2, and the long baggage is placed stretching over both the rear seat space and the trunk room.

In this type of the motor car, a striker 4 shaped like a bent rod is attached to the rear seat back or the car body. locking device 10 is attached to the seat back or the car body (not being attached with the striker). In the illustrated case, the striker 4 is attached to the car body, and the locking devices are attached to the rear seat backs 1L and 1R. To turn the rear seat backs 1L and 1R down onto the seat cushion 2, a lock-removal knob 11 of the locking device 10 is operated to remove the locking of the locking device.

To suppress an impact generated when the striker 4 is put into the locking device 10 and prevent a play of the striker 4 being locked, a buffering member, e.g., a cushion rubber pad, is generally assembled into the locking device. The buffering member will lose its buffering function by aging or wear. The striker 4 plays when its function is reduced or lost. Thus, the locking device using the buffering member is difficult in maintaining its product quality for a long time.

To cope with this problem, there is proposed a novel vehicular locking device which is provided with a striker pressing member which receives a thrust of the striker in a state that the latch plate being in press contact with the striker is held down in its turn.

In the above locking device, the striker pressing member is coaxially coupled into the locking plate for holding down the turn of the latch plate. Therefore, in manufacturing the locking device not requiring the striker pressing members and those requiring the same, it is difficult to increase a rate of the number of the component parts of the locking devices that may be used commonly for both types of the locking devices to the number of all the component parts thereof and it is difficult to reduce the manufacturing cost.

Also in the above device, the striker pressing member and the locking plate are coaxially assembled. Because of this, it is difficult to set the amount of turn of the striker pressing member as desired. To satisfactorily press the striker pressing member against the striker, it is necessary to use a spring having a large force to urge the striker pressing member against the striker.

The striker pressing member is disposed such that its turning center lies offset from the line representative of the advancing direction of the striker. Therefore, to obtain a pressing force dependent on a load acting in the same direction as of a play of the striker, a larger spring force is required for the spring for urging the striker pressing member against the striker.

SUMMARY OF THE INVENTION

Accordingly, an object of the present invention is to provide a locking device which increases the number of the component parts of the locking device that may be used for assembling the locking device not using the striker pressing members, efficiently generates the pressing force of the striker pressing member against the striker, and sets the amount of turn of the striker pressing member as desired.

A solution to the above problems, presented by the present invention, may take the form of a casing; a cover fastened to the casing into a unit construction; a latch plate for latching a striker, the latch plate being rotatably supported by the casing and the cover; a locking plate being rotatably supported by the casing and the cover, the locking plate locking the latch plate in its turn, thereby to ensure the latching of the striker by the latch plate; locking-state removal means for removing the locking of the striker by the latch plate by turning the locking plate; and a striker pressing plate, rotatably supported by the cover, for pressing the striker against the latch plate in a state that the latch plate is locked in its turn.

With such a construction, the locking plate is abutted against the latch plate in a state that the striker is latched by the latch plate, whereby the locking state of the striker is stably retained. When the striker is locked, it is tightly held between the striker pressing plate and the latch plate, eliminating a play of the striker.

For the locking device of the type which needs no measure taken for preventing the striker from playing, viz., the locking device not having the striker pressing plate, the striker pressing plate is detached from the cover plate, and the cover plate not having the striker pressing plate is used for its assembling.

The above-mentioned locking device as the solution presented by the present invention may modified as follows:

The locking device may further comprise means for interactively turning the locking plate and the striker pressing plate within a predetermined region. In this case, the interactively turning means may be a link member coupled at one end with the locking plate and at the other end with the striker pressing plate. Alternatively, it may include cam faces formed on the locking plate and the striker pressing plate.

Further, the link member may include a protruded piece for preventing the link member per se from slipping off from the locking plate and the striker pressing plate.

If the device further comprises an urging means coupled at one end with the cover plate while being held between the cover plate and the striker pressing plate and at the other end with the striker pressing plate, the urging means pressing the striker against the latch plate in a state that the latch plate is locked in its turn.

Still further, a coupling part may be formed in the cover plate, the coupling part pivotally supporting a coupling part formed on the striker pressing plate, and the coupling parts may include slip-off preventing means for preventing the coupling parts from slipping off one from the other. It is desirable that the turning center of the striker pressing plate lies on the line representative of the advancing direction of the striker.

DETAILED DESCRIPTION OF THE PREFERRED EMBODIMENTS

An exemplar embodiment of the present invention will be described in detail with reference to FIGS. 1 through 8. In the embodiment, the present invention is incorporated into the locking device for the reclining rear seat back already described with reference to FIG. 20.

Figure 1:
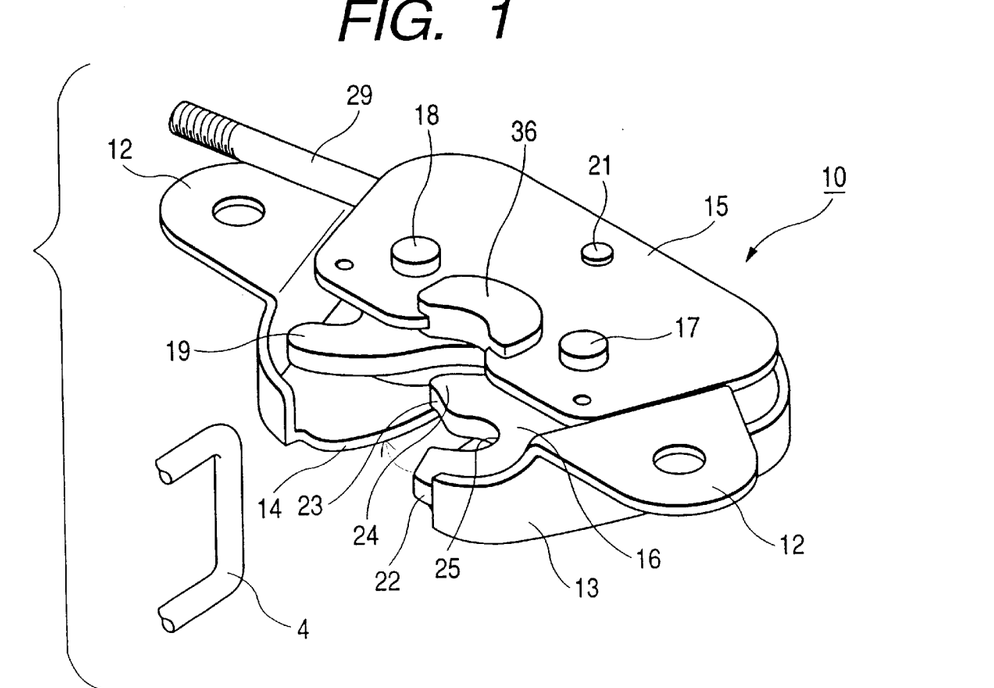
FIG. 1 is a perspective view showing an external appearance of a locking device which is a first embodiment of the present invention.
Figure 2:
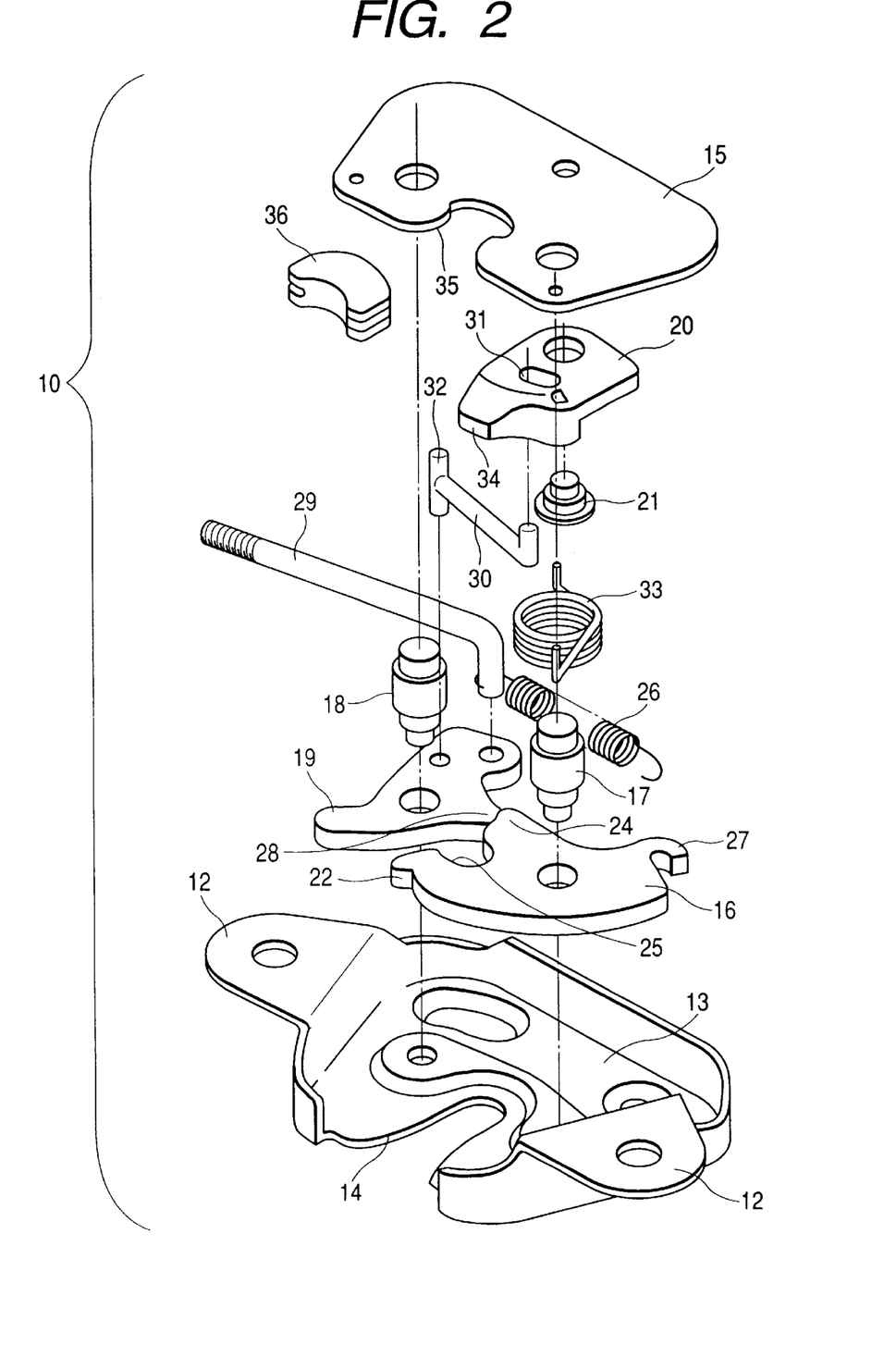
FIG. 2 an exploded view showing the structure of the locking device in FIG. 1.
Figure 3:
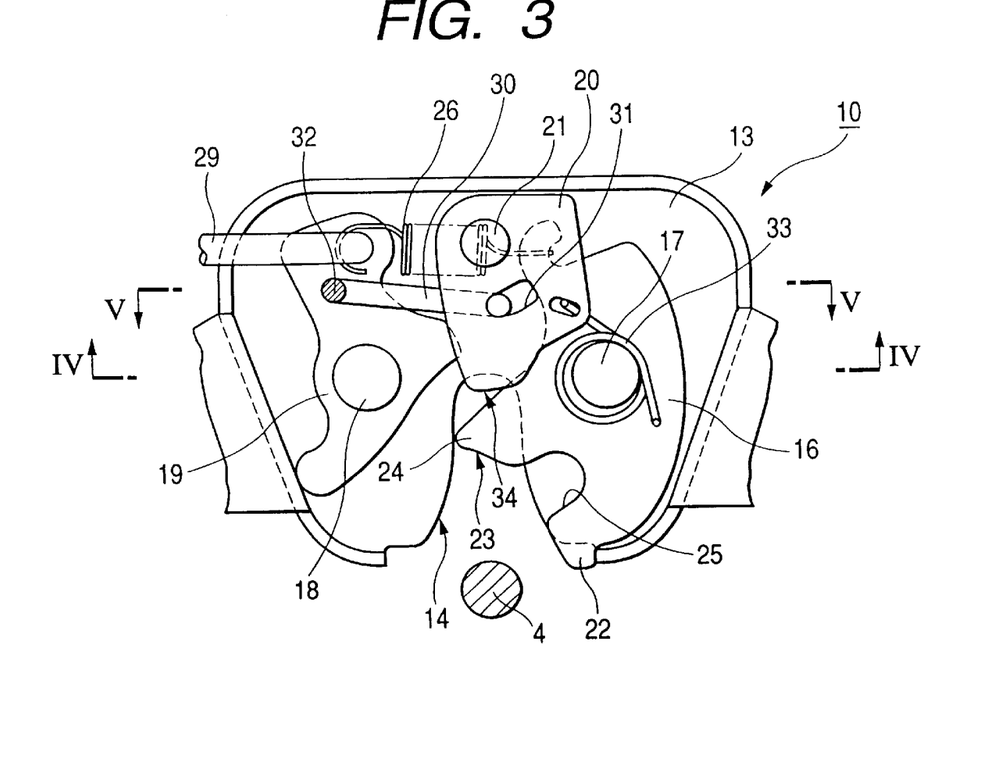
FIG. 3 is a plan view showing the inner structure of the locking device in FIG. 1.
Figure 4:
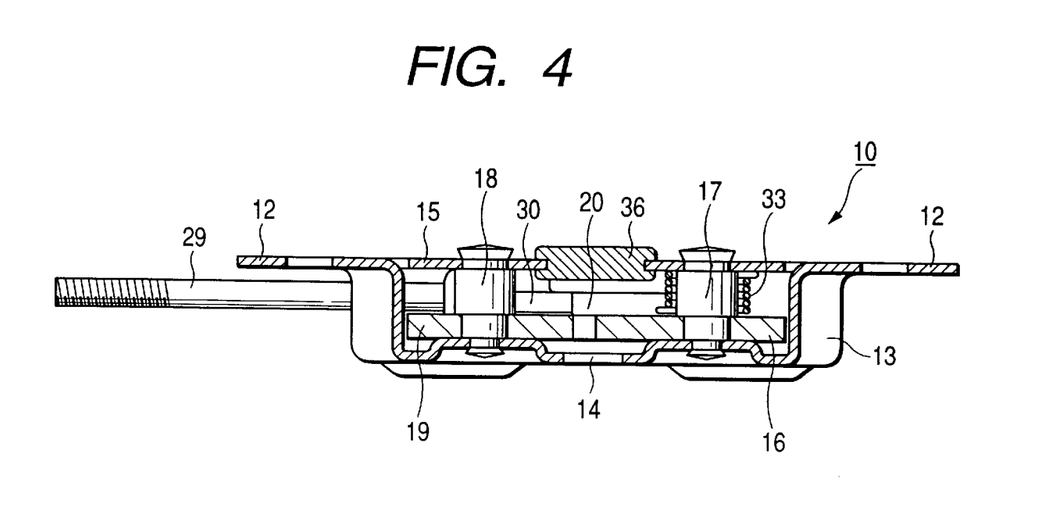
FIG. 4 is a cross sectional view taken along line IV—IV in FIG. 3.
Figure 5:
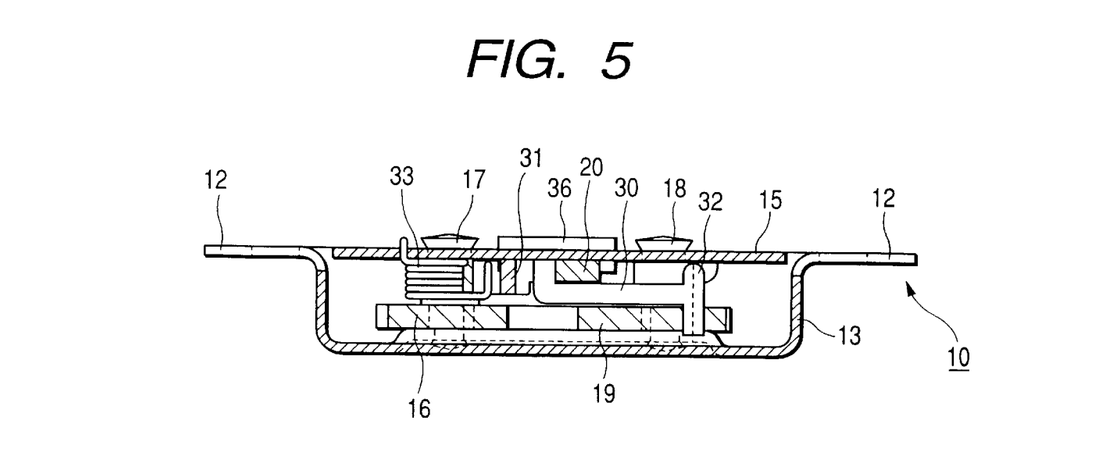
FIG. 5 is a cross sectional view taken along line V—V in FIG. 3.

Reference is made to FIG. 1 showing an external appearance of the locking device, FIG. 2 showing in exploded view of the structure of the locking device, FIG. 3 showing the inner structure of the same, FIG. 4 showing a cross sectional view taken along line IV—IV in FIG. 3, and FIG. 5 showing a cross sectional view taken along line V—V in FIG. 3. A frame-shaped casing 13 is provided with a couple of brackets 12 to be fastened to a frame (not shown) of a couple of rear seat backs 1L and 1R, and has a striker guide recess 14. A striker 4 may be moved into and out of the striker guide recess 14 (viz., moved in the upward and downward directions in FIG. 3).

A cover plate 15 overlies the casing 13. A latch plate 16 is pivotally supported by a latch-plate support shaft 17 in a space between the casing 13 and the cover plate 15. Also in the space, a locking plate 19 is pivotally supported by a locking-plate support shaft 18, oriented parallel to the latch-plate support shaft 17. The latch-plate support shaft 17 and the locking-plate support shaft 18 are caulked at their extreme ends onto the casing 13 and the cover plate 15.

A space is present between the combination of the latch plate 16 and the locking plate 19, and the cover plate 15. In the space, a striker pressing plate 20 is pivotally supported by a striker pressing plate support shaft 21, which is oriented parallel to in the latch-plate support shaft 17 and the locking-plate support shaft 18. One end of the support shaft 21 is engaged with the striker pressing plate 20, while the other end is caulked onto the cover plate 15. The support shaft 21 lies on a prolongation from a line extending in the longitudinal direction (vertical direction in FIG. 3) of the striker guide recess 14 so that the axial line of the striker pressing plate support shaft 21 lies on a prolongation from a line representative of the advancing direction of the striker 4.

The latch plate 16 includes a stopper part 22, a protruded part 24, a striker receiving recess 25, and a spring receiving part 27. The stopper part 22 is to be brought into contact with the opening end of the striker guide recess 14 of the casing 13. The protruded part 24 includes an engaging part 23 which will engage with the locking plate 19 when assembled. The striker receiving recess 25 for receiving the striker 4 is located between the engaging part 23 and the stopper part 22. The spring receiving part 27 is used for fixing a return spring 26.

The locking plate 19 includes an engaging part 28 which may engage with the engaging part 23 of the latch plate 16. The base of a lock-removal rod 29 is rotatably coupled with the locking plate 19 having the engaging part 28. The lock-removal knob 11 (FIG. 20) is fastened to the tip of the lock-removal rod 29 by means of screw means. The other end of the return spring 26 is coupled to the base of the lock-removal rod 29. A pulling force developed by the return spring 26 urges the latch plate 16 to turn about the latch-plate support shaft 17 counterclockwise (FIG. 3), and it urges the locking plate 19 to turn about the locking-plate support shaft 18 clockwise in (FIG. 3).

The locking plate 19 and the striker pressing plate 20 are coupled with each other by a link member 30 interposed therebetween. One end of the link member 30 is rotatably coupled with the locking plate 19, while the other end is slidably placed in an elongated hole 31 formed in the striker pressing plate 20. The striker pressing plate 20 moves with the turning of the locking plate 19, while allowing the other end of the link member 30 to move along and within the elongated hole 31.

A protruded piece 32 is protruded from one end of the link member 30 toward the cover plate 15, and its tip is located close to the cover plate 15 when assembled. The protruded piece 32 is used for preventing the link member 30 from slipping off from the locking plate 19 and the striker pressing plate 20.

A twisted, coiled spring 33 is applied to the latch-plate support shaft 17, which is disposed between the latch plate 16 and the cover plate 15. The coiled spring 33 is fixed at one end to the cover plate 15 and at the other end to the striker pressing plate 20. The spring force of the coiled spring 33 urges the striker pressing plate 20 to turn about the support shaft 21 counterclockwise. The striker pressing plate 20 includes a surface portion 34 against which the striker 4 abuts. A distance from the support shaft 21 to the surface portion 34 gradually increases in the clockwise direction.

The cover plate 15 has a striker receiving recess 35 at a location where it faces the striker guide recess 14. A bumper rubber piece 36 is fit into the striker receiving recess 35 as a buffering means.

When the striker 4, positioned as shown FIG. 3, is moved and goes into the striker guide recess 14, the striker 4 comes into contact with the engaging part 23 of the latch plate 16; the latch plate 16 then starts to turn clockwise while resisting the spring force of the return spring 26; the protruded part 24 of the latch plate 16 is pressed against the engaging part 28 of the locking plate 19; the locking plate 19 thereby starts to turn counterclockwise; and the striker pressing plate 20 in turn starts to turn clockwise through the link member 30.

Figure 6:
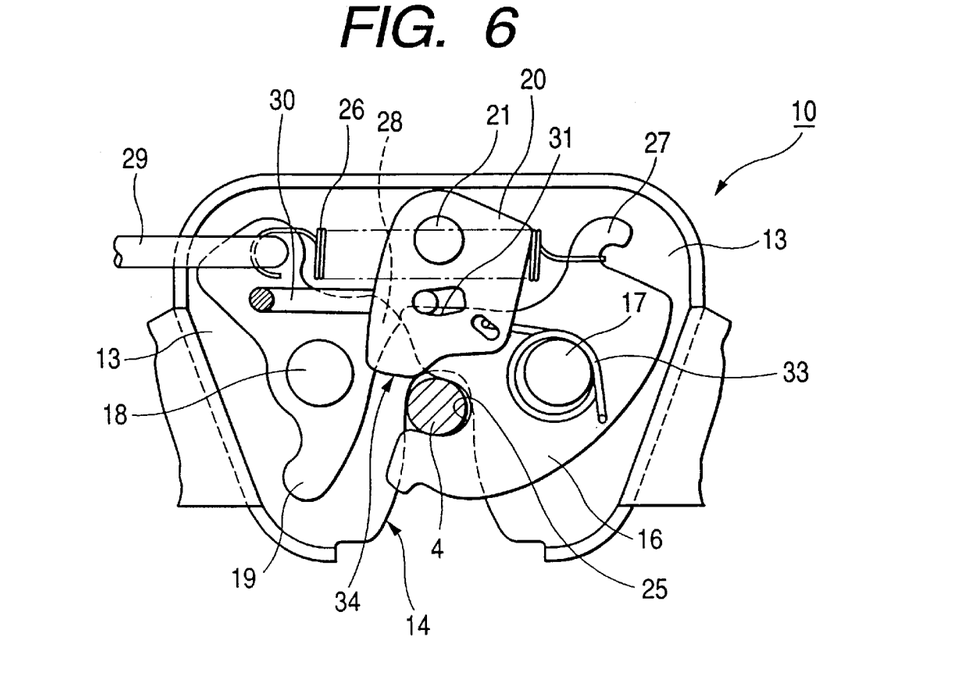
FIG. 6 is a plan view showing the operation of the locking device in FIG. 3.
Figure 7:
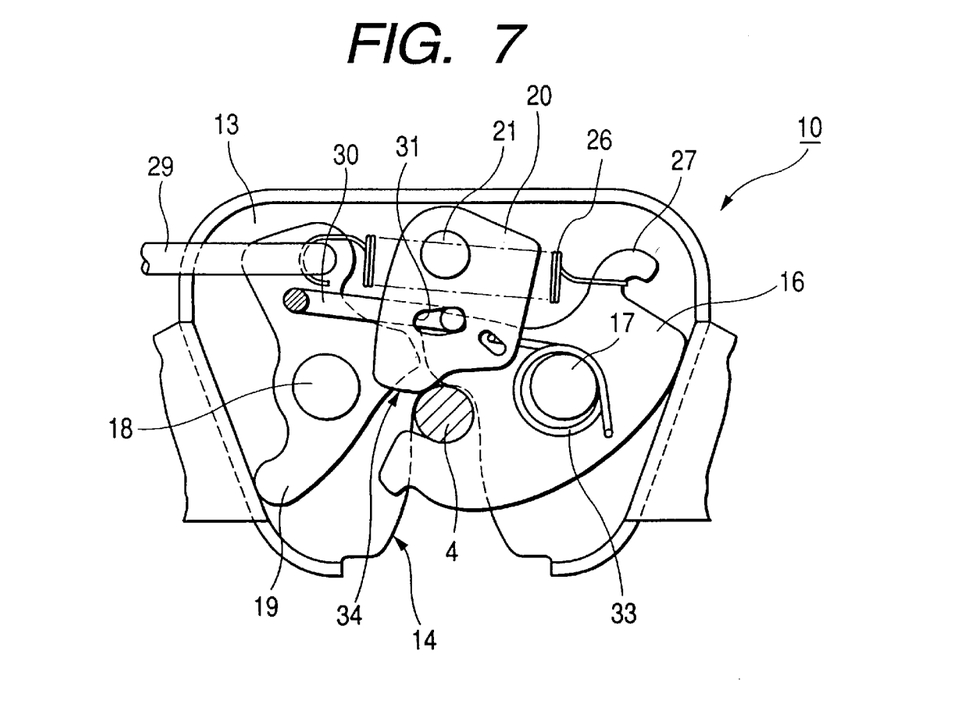
FIG. 7 is a plan view showing the operation of the locking device in FIG. 3.

As shown in FIG. 6, the striker 4 goes into the striker receiving recess 25 and abuts against the bumper rubber piece 36 (not shown); the striker 4 further advances by inertia; the protruded part 24 (not shown) of the latch plate 16 slips off from the engaging part 28 of the locking plate 19; the locking plate 19 is turned clockwise by the spring force of the return spring 26 by a distance corresponding to a movement of the other end of the link member 30 along and within the elongated hole 31; and the assembly of the locking device is put in a state as shown in FIG. 7.

Figure 8:
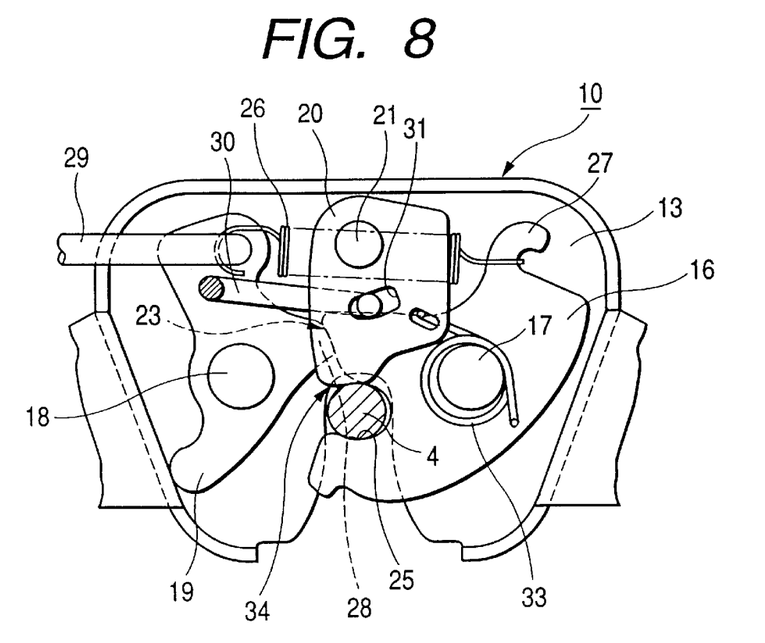
FIG. 8 is a plan view showing the operation of the locking device in FIG. 3.

The spring force of the return spring 26 turns the latch plate 16 counterclockwise, and the engaging part 28 of the locking plate 19 is brought into engagement with the engaging part 23 (not shown). The result is that the latch plate 16 is locked in its turn as shown in FIG. 8. By the spring force of the coiled spring 33, the surface portion 34 of the striker pressing plate 20 is brought into contact with the striker 4. The result is that the striker 4 is firmly held between the surface portion 34 of the striker pressing plate 20 and the striker receiving recess 25 of the latch plate 16, eliminating a play of the striker 4.

To remove the locking state of the striker 4 by the locking device, the lock-removal rod 29 is pulled to the left in FIG. 8 by operating the lock removal knob 11; the locking plate 19 is forcibly turned counterclockwise while resisting the spring forces of the return spring 26 and the coiled spring 33; the locking plate 19 is further turned from its position shown in FIG. 6 in the counterclockwise direction; and the latch plate 16 is turned counterclockwise by the return spring 26 to purge the striker 4 out of the striker guide recess 14.

In the assembly of the locking device mentioned above, the striker pressing plate 20 is attached to the cover plate 15. Therefore, in manufacturing locking devices not using the striker pressing plate 20, only the cover plate is altered while the remaining component parts remains unchanged. This fact accrues to the manufacturing cost reduction. Further, the locking plate 19 and the striker pressing plate 20 are coupled with each other by the utilization of the link member 30. Because of this structural feature, the amount of turn of the striker pressing plate 20 may be selected, as desired, with respect to the amount of turn of the locking plate 19. The result is an increase of design freedom, e.g., improvement of the pressing force applied to the striker 4. Further, it is noted that the support shaft 21 is placed on the line prolonged from the line of the advancing direction of striker 4. When the striker 4 plays, no rotation moment acts on the striker pressing plate 20, although it is inevitably developed in the conventional locking device. Therefore, the locking device can efficiently exercise its locking function to the striker 4. Furthermore, it is noted that a distance from the support shaft 21 to the surface portion 34 gradually increases in the direction of turning the striker pressing plate 20 by the spring force of the coiled spring 33. If the surface portion 34 is worn, the new surface portion 34 is pressed against the striker 4, producing no play of the striker 4.

In the embodiment, the striker pressing plate 20 is pivotally supported with respect to the cover plate 15, with the aid of the striker pressing support shaft 21 that is caulked onto the cover plate 15. If required, the fitting portion corresponding to the support shaft 21 may be molded in one-piece construction by plastic working, e.g., burring working. By so doing, the number of parts required for the assembly of the locking device is reduced.

Another exemplar locking device constructed to another aspect of the present invention will be described with reference to FIGS. 9 through 15. In these figures, like reference numerals are used for designating like or equivalent portions in the first embodiment.

Figure 9:
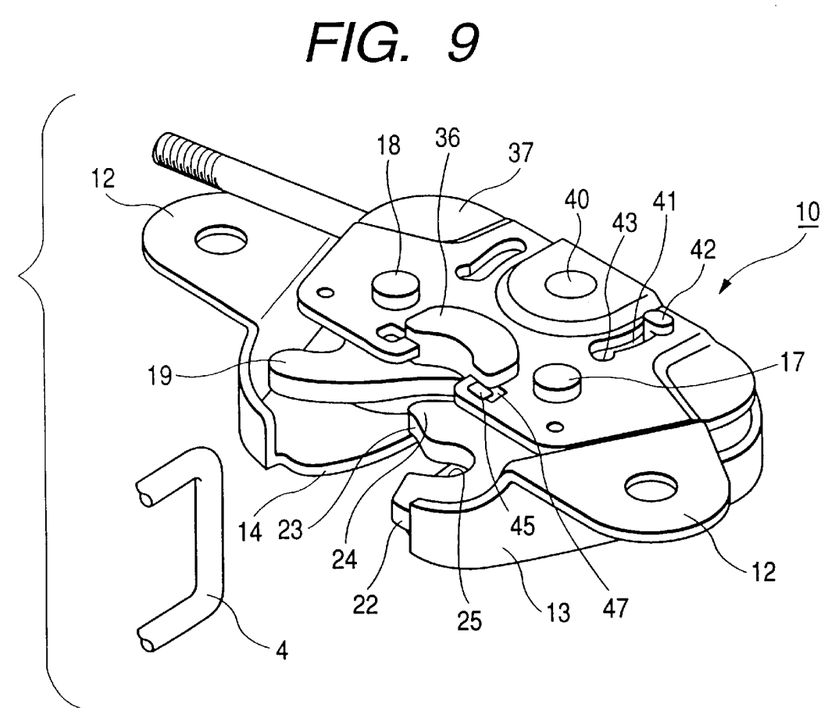
FIG. 9 is a perspective view showing an external appearance of a locking device which is a second embodiment of the invention.
Figure 10:
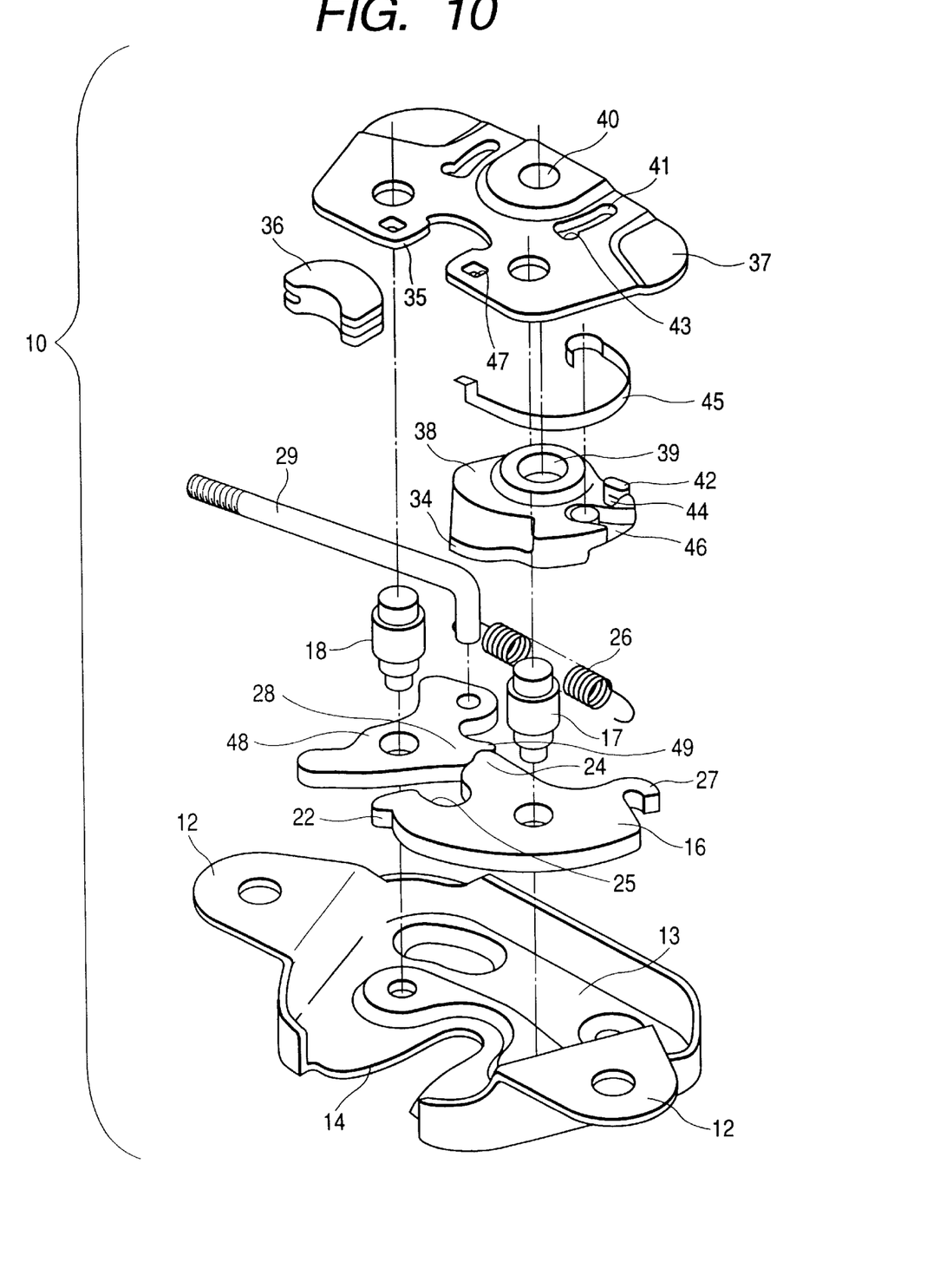
FIG. 10 is an exploded view showing the structure of the locking den FIG. 9.
Figure 11:
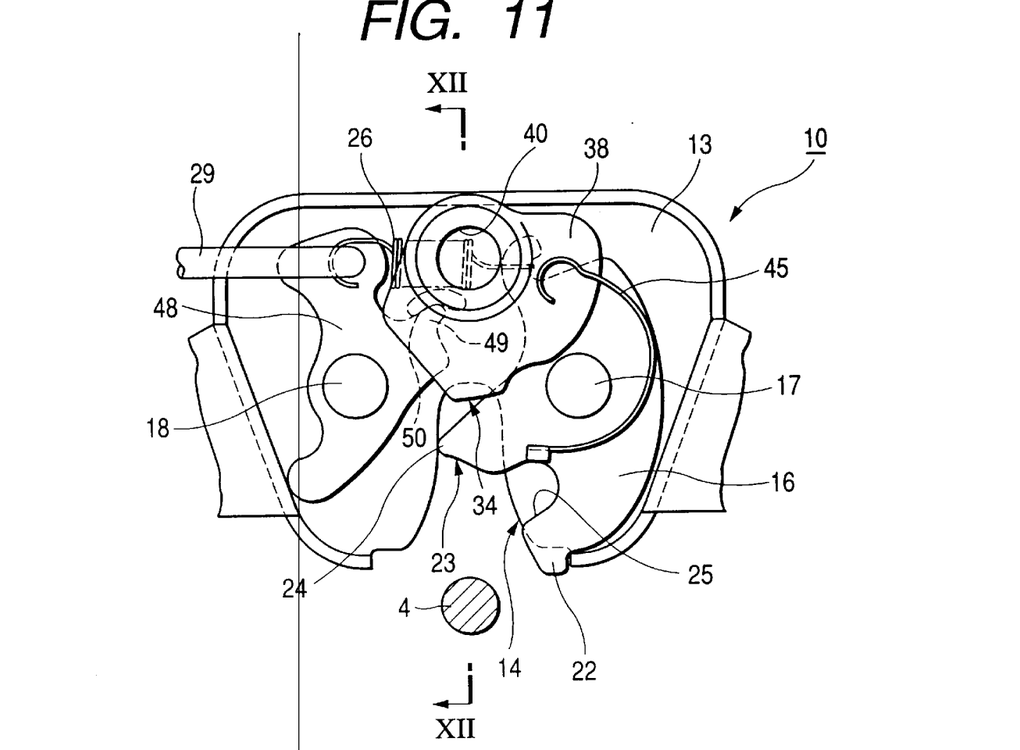
FIG. 11 is a plan view showing the inner structure of the locking device in FIG. 9.
Figure 12:
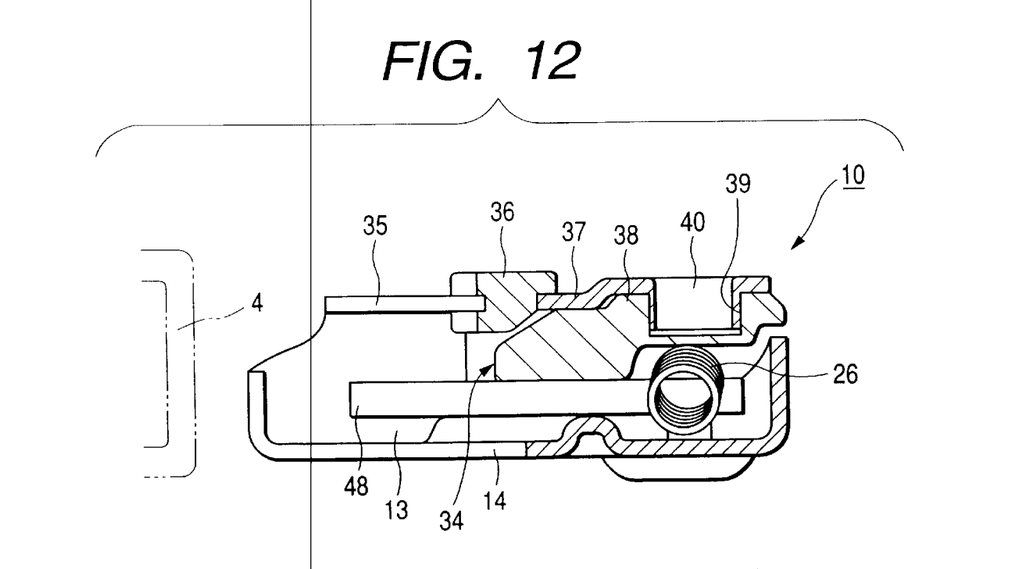
FIG. 12 is a cross sectional view taken along line XII—XII in FIG. 11.

Reference is made to FIG. 9 showing an external appearance of the locking device of the second embodiment, FIG. 10 showing in exploded form the structure of the locking device, FIG. 11 showing the inner structure of the same, and FIG. 12 showing a cross sectional view taken along line XII—XII in FIG. 11. A cover plate 37 has an engaging protrusion 40 formed by burring process. The protrusion 40 is to be tightly fit into a bore 39 of a striker pressing plate 38. An arcuate guide slit 41 is formed in the cover plate 37 while being located close to and along the engaging protrusion 40. One end of the arcuate guide slit 41 is somewhat enlarged to provide a guide hole 43. This hole receives a hook-like curved piece 42 as a tip of an engaging shaft 44 protruded from the striker pressing plate 38.

The engaging shaft 44 having the curved piece 42 at its tip stands erect on the striker pressing plate 38. The shaft 44 is inserted into the arcuate guide slit 41 and movable along the arcuate guide slit 41. Further, the striker pressing plate 38 includes a spring receiving part 46 for receiving one end of an arcuate plate spring 45. The one end of the arcuate plate spring 45 is held between the spring receiving part 46 and the cover plate 37. The plate spring 45 corresponds to the coiled spring 33 in the first embodiment. The other end of the plate spring 45 is put in a square spring stopper 47 of the cover plate 37.

To temporarily assemble the cover plate 37, the striker pressing plate 38 and the plate spring 45, the one end of the plate spring 45 is put on the spring receiving part 46 of the striker pressing plate 38; the curved piece 42 is aligned with the guide hole 43; in this state, the engaging protrusion 40 of the cover plate 37 is inserted into the bore 39. The result is that the curved piece 42 is projected above the surface of the cover plate 37, while its base part, or the engaging shaft 44, passes through the guide hole 43 of the cover plate 37. In this state, the striker pressing plate 38 is turned and the other end of the plate spring 45 is put in the square spring stopper 47 of the cover plate 37. In turn the curved piece 42 of the engaging shaft 44 is moved toward the arcuate guide slit 41, whereby the cover plate 37 and the striker pressing plate 38 are coupled together, with the plate spring 45 being located therebetween. With such a temporarily assembling, the second embodiment improves over the first embodiment in the workability in manufacturing the locking device 10.

The present embodiment is designed such that a locking plate 48 and the striker pressing plate 38 interactively turn within a predetermined region. To this end, the engaging shaft 44 and the striker pressing plate 38 include cam faces 49 and 50. When the locking plate 48 turns within the predetermined region, the cam face 50 of the striker pressing plate 38 follows, in motion, the cam face 49 of the locking plate 48. Provision of those cam faces 49 and 50 eliminates the necessity of the link member 30 used in the first embodiment in the device design. This technical feature produces many beneficial results: reduction of the number of required component parts and cost to manufacture, and simplification of assembling work.

When the striker 4, positioned as shown FIG. 11, is moved and goes into the striker guide recess 14, the striker 4 comes into contact with the engaging part 23 of the latch plate 16; the latch plate 16 then starts to turn clockwise while resisting the spring force of the return spring 26; the protruded part 24 of the latch plate 16 is pressed against the engaging part 28 of the locking plate 48; the locking plate 48 thereby starts to turn counterclockwise; and the striker pressing plate 38 in turn starts to turn clockwise through the cam faces 49 and 50.

Figure 13:
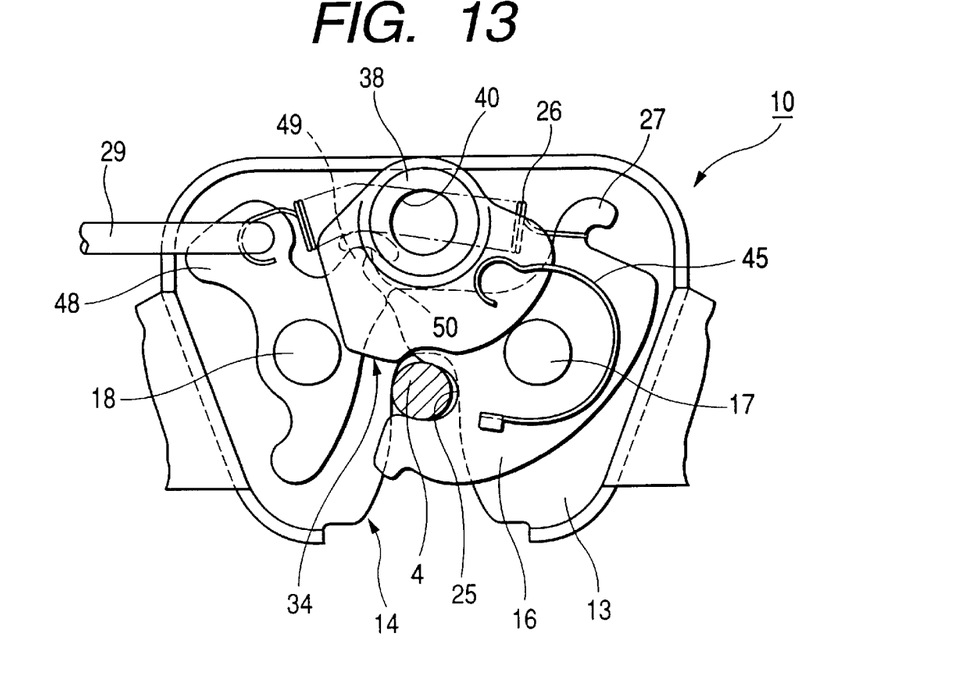
FIG. 13 is a plan view showing the operation of the locking device in FIG. 11.
Figure 14:
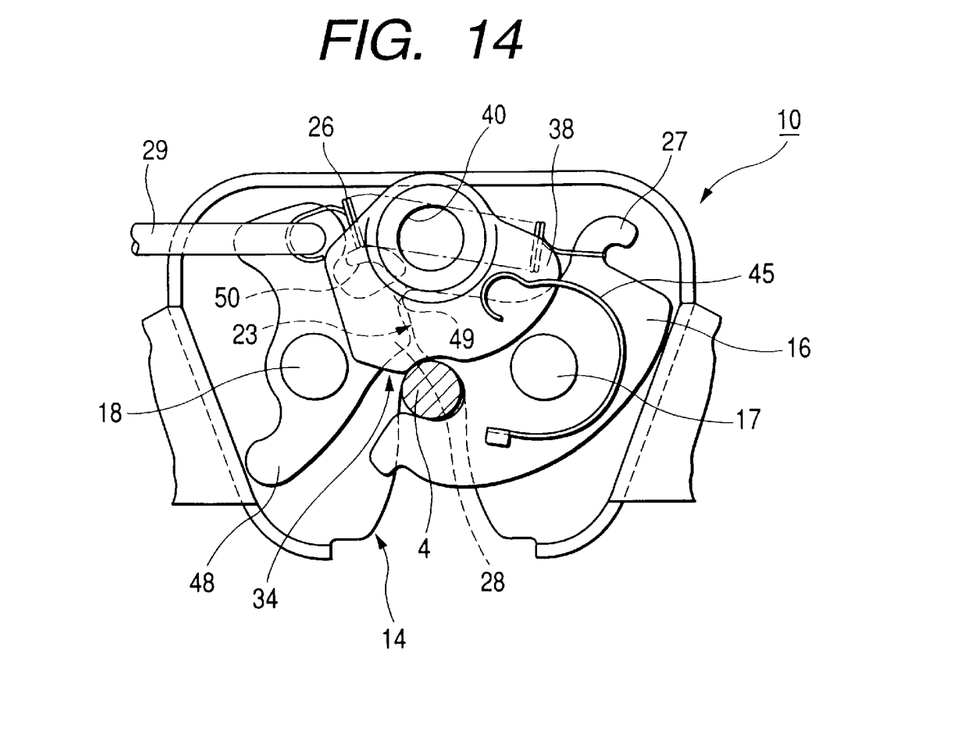
FIG. 14 is a plan view showing the operation of the locking device in FIG. 11.

As shown in FIG. 13, the striker 4 goes into the striker receiving recess 25 and abuts against the bumper rubber piece 36; the striker 4 further advances by inertia; the protruded part 24 of the latch plate 16 slips off from the engaging part 28 of the locking plate 48; the locking plate 48 is turned clockwise by the spring force of the return spring 26; and the assembly of the locking device is put in a state as shown in FIG. 14.

Figure 15:
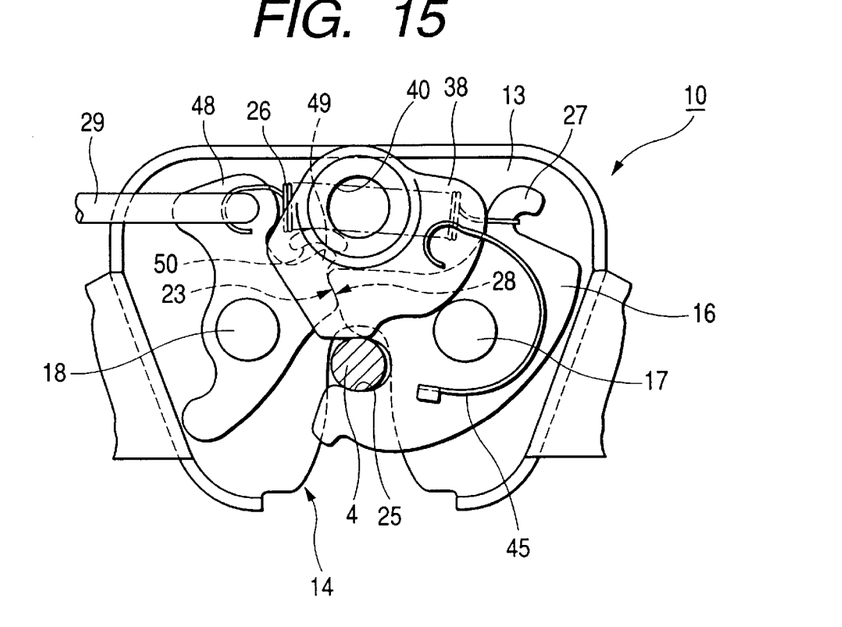
FIG. 15 is a plan view showing the operation of the locking device in FIG. 11.

The spring force of the return spring 26 turns the latch plate 16 counterclockwise, and the engaging part 28 of the locking plate 48 is brought into engagement with the engaging part 23. The result is that the latch plate 16 is locked in its turn as shown in FIG. 15. By the spring force of the plate spring 45, the surface portion 34 of the striker pressing plate 38 is brought into contact with the striker 4. The result is that the striker 4 is firmly held between the surface portion 34 of the striker pressing plate 38 and the striker receiving recess 25 of the latch plate 16, eliminating a play of the striker 4.

To remove the locking state of the striker 4 by the locking device, the lock-removal rod 29 is pulled to the left in FIG. 15 by operating the lock removal knob 11; the locking plate 48 is forcibly turned counterclockwise while resisting the spring forces of the return spring 26 and the plate spring 45; the locking plate 48 is further turned from its position shown in FIG. 13 in the counterclockwise direction; and the latch plate 16 is turned counterclockwise by the return spring 26 to purge the striker 4 out of the striker guide recess 14.

In the second embodiment, the engaging protrusion 40 is formed on the cover plate 37, and the bore 39 is formed in the striker pressing plate 38. It is evident that the engaging protrusion 40 may be formed on the striker pressing plate 38, and the bore 39 may be formed on the cover plate 37.

Figure 16:
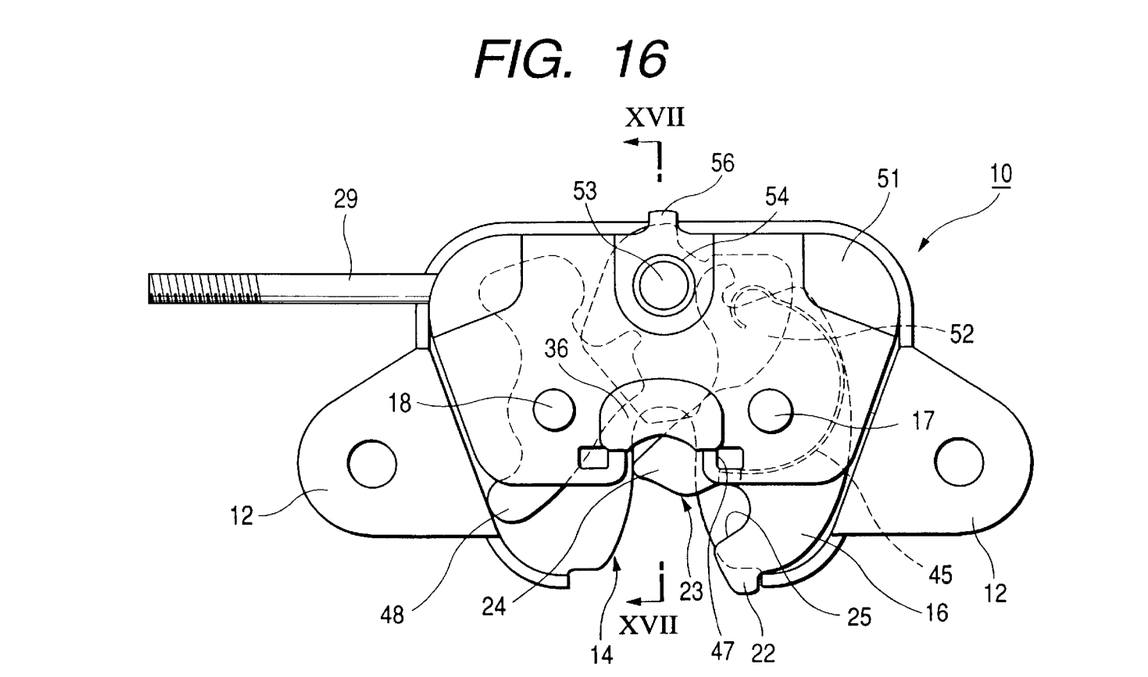
FIG. 16 is a plan view showing a locking device which is a third embodiment of the present invention.
Figure 17:
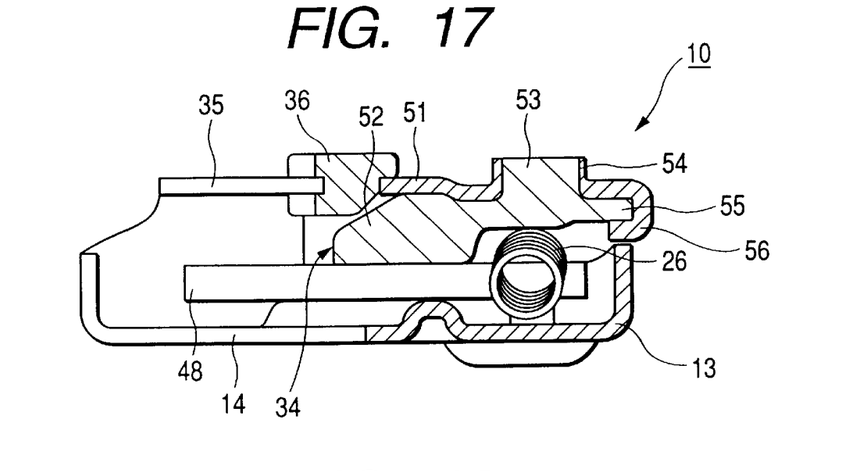
FIG. 17 is a cross sectional view taken along line XVII—XVII in FIG. 16.
Figure 18:
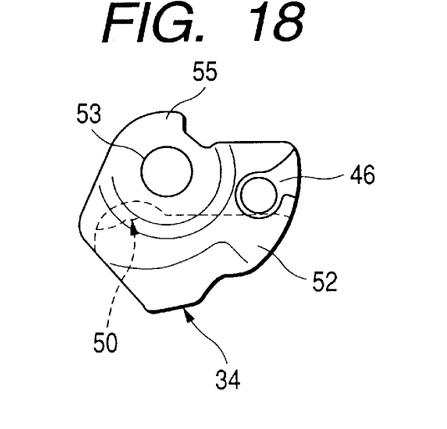
FIG. 18 is a plan view showing a striker pressing plate used in the locking device in FIG. 16.
Figure 19:
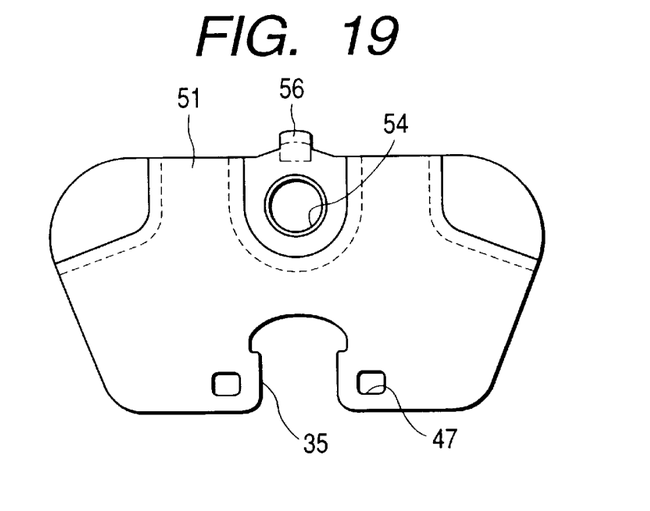
FIG. 19 is a plan view showing a cover plate used in the locking device in FIG. 16.

A locking device constructed according to yet another aspect of the present invention will be described with reference to FIGS. 16 through 19. Reference is made to FIG. 16 showing a plan view of the locking device of the third embodiment, FIG. 17 showing a cross sectional view taken along line XVII—XVII in FIG. 16, and FIGS. 18 and 19 showing plan views of a striker pressing plate and a cover plate. In these figures, like reference numerals are used for designating like or equivalent portions in the embodiments previously described.

A bore 54 is formed in a cover plate 51. An engaging protrusion 53 is formed on the striker pressing plate 52. The engaging protrusion 53 is slidably put in the bore 54. The cover plate 51 includes a portion 56 shaped like U in cross section. A flange portion 55 of the striker pressing plate 52 is put into the U-shaped portion 56 and fastened therewith. The flange portion 55 and the U-shaped portion 56 form slip-off preventing means.

In the second embodiment already described, the curved piece 42 of the striker pressing plate 38 has the function corresponding to that of the U-shaped portion 56. To manufacture the hook-like curved piece 42, much and complicated work is consumed. However, the striker pressing plate 52 of the third embodiment may simply be manufactured by plastic working. Therefore, the cost to manufacture is reduced.

As seen from the foregoing description, the striker pressing plate is included in the cover plate. Most of the component parts of the locking device using the striker pressing plate may be used, without any modification, for assembling a locking device not using the striker pressing plate.

In the construction of the locking device, the means for interactively turning the locking plate and the striker pressing plate may include cam faces formed on the locking plate and the striker pressing plate. Further, the cover plate and the striker pressing plate may include coupling means by which those plates are rotatably coupled with each other. In this case, the number of parts required for the locking device is reduced, and the caulking work is not used. The result is that the cost to manufacture is reduced.

It is noted that the center of rotation of the locking plate is offset from that of the striker pressing plate and those plates are coupled with each other by means of the interactively turning means. With this structural feature, the amount of turn of the striker pressing plate may be adjusted as desired. Further, a satisfactory urging force of the striker pressing plate may be secured if a spring of small spring force is used for the spring for urging the striker pressing plate.

In the locking device in which the turning center of the striker pressing plate lies on the line representative of the advancing direction of the striker, a load acting in the same direction as of a play of the striker directly acts on the center of rotation of the striker pressing plate. Therefore, its durability and mechanical strength are improved, so that the locking of the striker is reliable.

The locking device may have such a construction that the urging means is held between the cover plate and the striker pressing plate, and that coupling means may be formed in the cover plate and on the striker pressing plate, and the coupling means include slip-off preventing means for preventing the coupling parts from slipping off one from the other. In this construction, the cover plate, the striker pressing plate, and the urging means may be temporarily assembled in advance. A speedy device manufacturing is realized.

What is claimed is:

1. A locking device comprising:

a casing;

a cover fastened to said casing and forming a striker guide recess cooperating with said casing;

a latch plate for locking a striker, said latch plate being rotatably supported by said casing and said cover;

a locking plate being rotatably supported by said casing and said cover, said locking plate locking said latch plate in its turn, thereby to ensure a locking of said striker by said latch plate;

locking-state removal means for removing the locking of said striker by said latch plate by turning said locking plate;

interactive turning means for interactively turning said locking plate and said striker pressing plate within a predetermined region; and a striker pressing plate, rotatably supported by said cover for pressing said striker against said latch plate in a state that said latch plate is locked in its turn, wherein said interactive turning means is a link member coupled at one end with said locking plate and at an other end with said striker pressing plate.

2. The locking device according to claim 1, in which said link member includes a protruded piece for preventing said link member per se from slipping off from said locking plate and said striker pressing plate.

3. A locking device comprising:

a casing;

a cover fastened to said casing and forming a striker guide recess cooperating with said casing;

a latch plate for locking a striker, said latch plate being rotatably supported by said casing and said cover;

a locking plate being rotatable supported by said casing and said cover, said locking plate locking said latch plate in its turn, thereby to ensure a locking of said striker by said latch plate;

locking-state removal means for removing the locking of said striker by said latch plate by turning said locking plate; and a striker pressing plate, rotatable supported by said cover for pressing said striker against said latch plate in a state that said latch plate is locked in its turn, wherein said striker pressing plate has an engaging protrusion and said cover has a bore engaged with said engaging protrusion so that said striker pressing plate is directly supported by said cover.

4. A locking device comprising:

a casing;

a cover fastened to said casing and forming a striker guide recess cooperating with said casing;

a latch plate for locking a striker, said latch plate being rotatable supported by said casing and said cover;

a locking plate being rotatably supported by said casing and said cover, said locking plate locking said latch plate in its turn, thereby to ensure a locking of said striker by said latch plate;

locking-state removal means for removing the locking of said striker by said latch plate by turning said locking plate; and a striker pressing plate, rotatable supported by said cover for pressing said striker against said latch plate in a state that said latch plate is locked in its turn, wherein said cover has a guide slit and said striker pressing plate has an engaging shaft inserted into and being movable along said guide slit.

5. The locking device according to claim 4, wherein said engaging shaft has a curved piece formed at a tip end thereof.

6. A locking device comprising:

a casing;

a cover fastened to said casing and forming a striker guide recess cooperating with said casing;

a latch plate for locking a striker, said latch plate being rotatably supported by said casing and said covery;

a locking plate being rotatably supported by said casing and said cover, said locking plate locking said latch plate in its turn, thereby to ensure a locking of said striker by said latch plate;

locking-state removal means for removing the locking of said striker by said latch plate by turning said locking plate;

a striker pressing plate, rotatable supported by said cover for pressing said striker against said latch plate in a state that said latch plate is locked in its turn; and a plate spring fixed on said cover at a first end thereof, said striker pressing plate having a spring receiving part for receiving a second end of said plate spring.

7. A locking device for use in combination with a striker, comprising:

a casing and a cover including a striker guide recess;

a latch plate rotatably supported between said casing and said cover and biased toward a first position; said latch plate further comprising a striker receiving recess and a first engaging part which overlaps said striker guide recess when said first engaging part is in said first position;

a locking plate rotatably supported between said casing and said cover, said locking plate including a second engaging part and said locking plate being in a first position;

a striker pressing plate, rotatably supported between said casing and said cover;

a lock removal rod rotatably attached to said locking plate; and a spring coupling said latch plate and said locking plate;

wherein sad striker is adapted to enter said striker guide recess to contact said first engaging part and rotate said latch plate to a second position wherein said striker receiving recess prevents movement of the striker out of said striker guide recess, wherein a rotation of said latch plate to said second position rotates said striker pressing plate and said locking plate into a position wherein said striker pressing plate, said locking plate, and said latch plate are all in a locked state, wherein a predetermined movement of said lock removal rod rotates said locking plate and terminates said locked state, thereby allowing said latch plate to assume said first position and allowing egress of the striker from said striker guide recess, and wherein said spring biases each of said latch plate and said locking plate in an opening direction.

8. The locking device according to claim 7, wherein said striker pressing plate has an engaging protrusion and said cover has a bore engaged with said engaging protrusion so that said striker pressing plate is directly supported by said cover.

9. The locking device according to claim 7, wherein said cover has a guide slit and said striker pressing plate has an engaging shaft inserted into and being movable along said guide slit.

10. The locking device according to claims 9, wherein said engaging shaft has a curved piece formed at a tip end thereof.

11. The locking device according to claim 7, further comprising a plate spring fixed on said cover at a first end thereof and said striker pressing plate has a spring receiving part for receiving a second end of said plate spring.

12. A locking device according to claim 1, wherein said one end of said link member is rotatably coupled with said locking plate, and said other end of said link member is slidably coupled with said striker pressing plate.

13. A locking device according to claim 12, wherein said other end of said link member is slidably disposed in an elongated hole formed in said striker pressing plate.

14. A locking device according to claims 12, wherein said other end of said link member is slidably disposed in a groove formed in said striker pressing plate.

* * * * *